(12) United States Patent
Nishioka

(10) Patent No.: US 12,468,031 B2
(45) Date of Patent: Nov. 11, 2025

(54) RADAR DEVICE FOR VEHICLE

(71) Applicant: DENSO CORPORATION, Kariya (JP)

(72) Inventor: Yasunori Nishioka, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 78 days.

(21) Appl. No.: 18/590,676

(22) Filed: Feb. 28, 2024

(65) Prior Publication Data
US 2024/0248201 A1 Jul. 25, 2024

Related U.S. Application Data

(63) Continuation of application No. PCT/JP2022/032857, filed on Aug. 31, 2022.

(30) Foreign Application Priority Data

Aug. 31, 2021 (JP) .................................. 2021-141577

(51) Int. Cl.
G01S 13/931 (2020.01)
G01S 13/08 (2006.01)
G01S 13/58 (2006.01)

(52) U.S. Cl.
CPC ............ *G01S 13/931* (2013.01); *G01S 13/08* (2013.01); *G01S 13/58* (2013.01)

(58) Field of Classification Search
CPC .................................. G01S 13/931; G01S 7/41
See application file for complete search history.

(56) References Cited

U.S. PATENT DOCUMENTS

| 2015/0321684 | A1* | 11/2015 | Lehnertz | ............... | B61L 23/041 246/477 |
| 2021/0001902 | A1* | 1/2021 | Tsutsumi | .............. | G01S 17/931 |
| 2021/0192235 | A1* | 6/2021 | Bolduc | ................... | G01S 7/487 |
| 2022/0026525 | A1 | 1/2022 | Shimizu et al. | | |

FOREIGN PATENT DOCUMENTS

JP 2023-035011 A 3/2023

OTHER PUBLICATIONS

U.S. Appl. No. 18/590,672 and its entire file history, Feb. 28, 2024.

* cited by examiner

Primary Examiner — Tarek Elarabi
(74) Attorney, Agent, or Firm — Maschoff Brennan

(57) ABSTRACT

A radar device according to one aspect of the present disclosure includes a target detection unit, a multipath ghost determination unit, a monorail environment determination unit, and a monorail vehicle determination unit. The multipath ghost determination unit extracts a relay reflective target from detected targets, and determines a moving object detected erroneously due to a stationary object from or to which radar waves are relayed by the relay reflective target, as being a multipath ghost. The monorail environment determination unit determines whether an environment in which the vehicle carrying the radar device is traveling is a monorail environment. When the environment in which the vehicle carrying the radar device is traveling is the monorail environment, the monorail vehicle determination unit determines that the relay reflective target is a monorail vehicle, based on the number of multipath ghosts.

4 Claims, 5 Drawing Sheets

RADAR DEVICE FOR VEHICLE

CROSS-REFERENCE TO RELATED APPLICATION

This application is a continuation application of International Application No. PCT/JP2022/032857 filed Aug. 31, 2022 which designated the U.S. and claims priority to Japanese Patent Application No. 2021-141577 filed with the Japan Patent Office on Aug. 31, 2021, the contents of each of which are incorporated herein by reference.

BACKGROUND

Technical Field

The present disclosure relates to a radar device for a vehicle, configured to detect targets around the vehicle by transmitting and receiving radar waves.

Related Art

A radar device for a vehicle is known, which is configured to emit radar waves to the surroundings of the vehicle and receive reflected waves to detect a distance to a target around the vehicle, a speed of the target, and a direction of the target, and to output the detection result to a driving assistance device mounted to the vehicle.

According to this radar device, while the vehicle is traveling, the radar device detects targets present in the forward direction of the vehicle and outputs the detection result to a driving assistance device, thereby implementing driving assistance to avoid a collision with the targets.

DESCRIPTION OF SPECIFIC EMBODIMENTS

Figure 1:
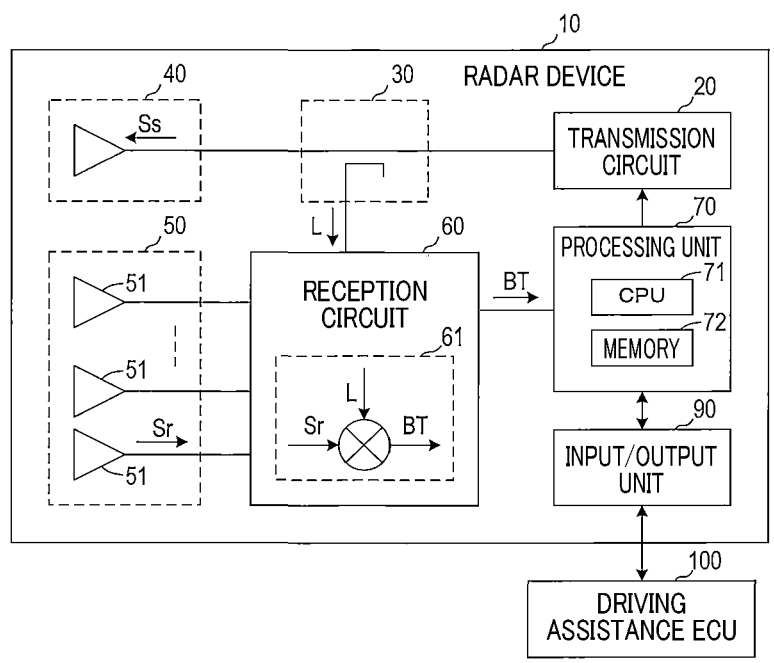
FIG. 1 is a block diagram illustrating the configuration of a radar device according to one embodiment.

In one environment in which a vehicle is traveling, an elevated monorail with a monorail vehicle suspended therefrom traveling may be present above a road on which the vehicle is traveling. In such an environment, the monorail vehicle traveling ahead of the subject vehicle may be detected by the above-known radar device as disclosed in JP2020-173164 A, as a moving object that obstructs traveling of the subject vehicle.

In such a case, since the vehicle radar device outputs the result of detection of the monorail vehicle to the driving assistance device, the driving assistance device will provide driving assistance to avoid a collision, even though the monorail vehicle does not obstruct traveling of the subject vehicle. Thus, in this case, an issue arises that the subject vehicle may be controlled erroneously due to driving assistance by the driving assistance device.

In view of the foregoing, it is desired to have a radar device for a vehicle, capable of determining that a detected target is a monorail vehicle.

A radar device for a vehicle, according to one aspect of the present disclosure, is configured to detect targets around the vehicle and includes a target detection unit, a multipath ghost determination unit, a monorail environment determination unit, and a monorail vehicle determination unit.

The target detection unit is configured to detect a position and a speed of a target by transmitting radar waves to surroundings of the vehicle, receiving reflected waves of the radar waves, and performing frequency analysis of transmission and reception signals. The monorail environment determination unit is configured to determine whether an environment in which the vehicle is traveling is a monorail environment where a monorail is present above a road on which the vehicle is traveling.

The multipath ghost determination unit is configured to extract, from a plurality of targets detected by the target detection unit, a moving object that relays the radar waves between the target detection unit and another target as a relay reflective target. The multipath ghost determination unit is further configured to determine a target detected erroneously as a moving object by the target detection unit due to a stationary object from or to which the radar waves are relayed by the relay reflective target, as being a multipath ghost.

The monorail vehicle determination unit is configured to, in response to the monorail environment determination unit determining that the environment in which the vehicle is traveling is the monorail environment, count, for each relay reflective target, a number of targets each determined to be a multipath ghost by the multipath ghost determination unit. The monorail vehicle determination unit is further configured to determine that the relay reflective target for which a first determination value set according to the counted number of targets is greater than or equal to a first threshold value is a monorail vehicle.

That is, in an environment where a suspended monorail is present above a road on which the vehicle is traveling, a monorail vehicle may be detected by the target detection unit as a target located ahead of the vehicle, and based on the speed of the target, it may be determined that it is a moving object that obstructs traveling of the vehicle.

In the case of a suspended monorail, when radar waves are irradiated on the monorail vehicle, some of reflected waves may hit a portion of the rail closer to the vehicle than the monorail vehicle, and reflected waves from that portion of the rail may return to the radar device via the monorail vehicle.

In this case, the monorail vehicle serves as a relay reflective target that relays the radar waves back and forth between the radar device and the rail. Upon reception of the reflected waves incident from the rail via the relay reflective target, the target detection unit detects the position and speed of a target, assuming that the reflected waves are from the target located farther away with the monorail vehicle therebetween.

The target detected in this manner is a multipath ghost detected erroneously due to radar wave reflections or multipath reflections, where a plurality of multipath ghosts caused by reflections from the rail are detected linearly, corresponding to the actual rail.

In the radar device of the present disclosure, since rails are stationary objects, the multipath ghost determination unit determines a target detected erroneously due to a stationary object from or to which the radar waves are relayed by the relay reflective target, as being a multipath ghost.

When the environment in which the vehicle is traveling is the monorail environment, the monorail vehicle determination unit counts, for each relay reflective target, a number of multipath ghosts, and based on the counted number of multipath ghosts, determines whether the relay reflective target is a monorail vehicle.

Therefore, the vehicle radar device of the present disclosure is capable of determining that the detected object is a monorail vehicle, thereby preventing the determination that the monorail vehicle is an object that obstructs traveling of the vehicle from being output to an external device, such as a driving assistance device.

In addition, it is not necessary to use images of surroundings of the vehicle captured by a camera to perform determination of monorail vehicles, which can simplify the device configuration.

Embodiments of the present disclosure will now be described with reference to the accompanying drawings.

Configuration

Figure 2:
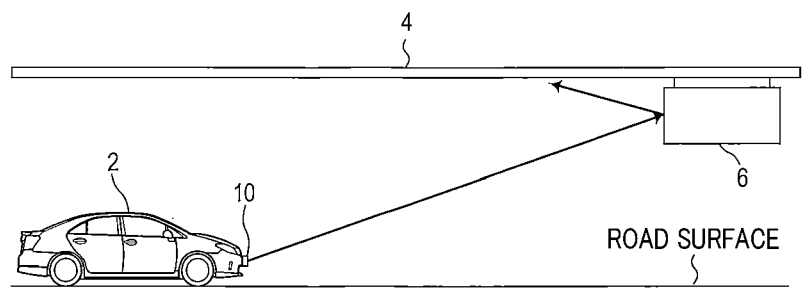
FIG. 2 is an illustration of the radar device mounted to a vehicle and a monorail environment.

A radar device 10 of the present embodiment is a radar device for a vehicle, which is disposed at the front center of the vehicle 2, for example, on the back side of the front bumper, as illustrated in FIG. 2.

This radar device 10 is used to detect targets ahead of the vehicle 2 carrying the radar device 10 (hereinafter referred to as a subject vehicle) by emitting radar waves in a forward direction of the subject vehicle 2 and receiving reflected waves from the targets.

In the present embodiment, the radar device 10 will now be described as detecting targets in front of the subject vehicle 2. Alternatively, the radar device 10 may be mounted to the rear portion of the subject vehicle 2, for example, to detect targets that are located behind the subject vehicle 2.

As illustrated in FIG. 1, the radar device 10 includes a transmission circuit 20, a divider 30, a transmitting antenna 40, a receiving antenna 50, a reception circuit 60, a processing unit 70, and an input/output unit 90.

The transmission circuit 20 is used to supply the transmission signal Ss to the transmitting antenna 40. The transmission circuit 20 inputs a high-frequency signal in the millimeter wave band to the divider 30 disposed upstream of the transmitting antenna 40.

The transmission circuit 20 modulates the frequency of the high-frequency (or RF) signal so that it gradually increases from the lowest, start frequency to the highest, end frequency, and repeats such modulation in a stepwise manner to generate an FCW-modulated high-frequency signal, which is in turn input to the divider 30. Therefore, the radar device 10 of the present embodiment is a FCM radar device.

The radar device 10 may be, for example, an FM-CW radar device, in which the transmission circuit 20 gradually increases and decreases the frequency of the high-frequency signal periodically, or may be, for example, a dual-frequency CW radar, in which the transmission circuit 20 periodically switches between two frequencies of the high-frequency signal.

The divider 30 distributes power of the high-frequency signal received from the transmission circuit 20 into a transmission signal Ss and a local signal L. Based on the transmission signal Ss provided from the divider 30, the transmitting antenna 40 emits a radar wave of the frequency corresponding to the transmission signal Ss.

The receiving antenna 50 is an antenna for receiving reflected waves that are radar waves reflected from targets. The receiving antenna 50 is configured as a linear array antenna with a plurality of antenna elements 51 arranged in a row. The reception signal Sr of the reflected wave received by each antenna element 51 is input to the reception circuit 60.

The reception circuit 60 processes the reception signal Sr received from each of the antenna elements 51 that constitute the receiving antenna 50 to generate and output a beat signal BT for each antenna element 51. Specifically, using a mixer 61, the reception circuit 60 generates and outputs a beat signal BT for each antenna element 51 by mixing the reception signal Sr received from the antenna element 51 and the local signal L received from the divider 30.

Outputting the beat signal BT includes amplifying the reception signal Sr and removing unwanted signal components from the beat signal BT.

In this manner, the beat signal BT for each of the antenna elements 51, which is generated and output from the reception circuit 60, is input to the processing unit 70.

The processing unit 70 is equipped with a microcomputer including a CPU 71 and a semiconductor memory such as RAM or ROM (hereinafter a memory 72). The processing unit 70 may be equipped with a coprocessor that performs a Fast Fourier Transform (hereinafter FFT).

The processing unit 70 performs, for each target that reflected the radar waves, a detection process (hereinafter, a target detection process) to calculate a distance R to the target, a speed V of the target, and an azimuth angle $\theta$ of the target by analyzing the beat signal BT for each antenna element 51.

The speed V of the target is a relative speed to the subject vehicle 2, and is approximately $(-1) \times$(vehicle speed) when the target reflecting the radar waves is a stationary object. The azimuth angle $\theta$ of the target is calculated with the central-axis direction of the radar waves emitted from the radar device 10 as 0 degrees.

A result of detection of the target by the processing unit 70 is output from the input/output unit 90 to a driving assistance ECU 100 of the subject vehicle 2. The input/output unit 90 is also used by the processing unit 70 to acquire a driving state of the subject vehicle, such as a vehicle speed and a steering angle of the subject vehicle 2, from an external device, such as the driving assistance ECU 100.

ECU is an abbreviation for Electronic Control Unit. The driving assistance ECU 100 performs various processes to assist the driver in driving the subject vehicle 2 based on detection results of targets received from the radar device 10.

The operations related to driving assistance may include, for example, alerting the driver of the presence of an approaching object, controlling the braking and steering devices of the subject vehicle 2 to avoid a collision with the approaching object. The operations may include controlling drive, braking, and operating systems of the subject vehicle 2 to cause the subject vehicle 2 to follow a preceding vehicle.

Functions of Processing Unit 70

Figure 3:
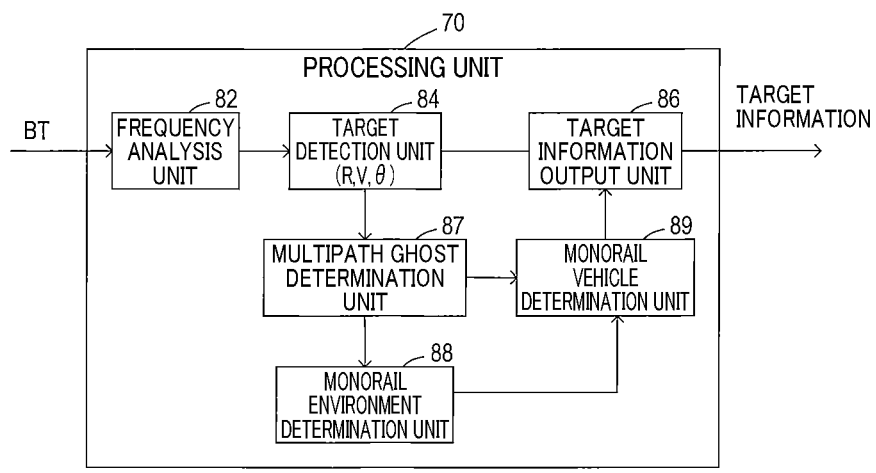
FIG. 3 is a block diagram illustrating the functional configuration of a processing unit.

As illustrated in FIG. 3, the processing unit 70 includes, as its functional configuration, a frequency analysis unit 82, a target detection unit 84, a target information output unit 86, a multipath ghost determination unit 87, a monorail environment determination unit 88, and a monorail vehicle determination unit 89.

The frequency analysis unit 82 has a function of searching for targets in the emission direction of the radar waves by acquiring the beat signals BT after analog to digital conversion, performing a fast Fourier transform (hereinafter referred to as FFT) on the acquired digital data of the beat signals BT.

Specifically, for example, the frequency analysis unit 82 performs distance frequency analysis by FFT processing the beat signals BT for each chirp of the transmission signal, whose frequency gradually increases from the start frequency to the end frequency according FCM modulation. The frequency analysis unit 82 further performs velocity frequency analysis by FFT processing the velocity frequency in the chirp direction.

As a result, the frequency analysis unit 82 provides an analysis result in which power spectrum peaks occur in the distance-velocity coordinate system according to such two-dimensional FFT processing. From the analysis result, the object detection unit 84 identifies targets in the emission direction of the radar waves and determines a distance R and a speed V of each target.

The frequency analysis unit 82 performs a process of determining the azimuth angle θ of each target from the phase difference between the beat signals BT acquired from the respective antenna elements 51. The target detection unit 84 identifies the position of each target from the distance R and azimuth angle θ calculated for the target, and outputs the position and speed V of the target to the target information output unit 86. Since the two-dimensional FFT and phase-difference-based azimuth detection scheme in the radar device 10 are well-known techniques, their details will not be described here.

The target information output unit 86 outputs target information representing the distance R, azimuth angle θ, and speed V of each target output from the target detection unit 84 to the driving assistance ECU 100. The target information output unit 86 restricts outputs of the target information of a target determined to be a monorail vehicle or monorail car in accordance with instructions from the monorail vehicle determination unit 89 that will be described later.

This restriction is implemented by ceasing to output target information or by outputting target information with information indicating that the vehicle is a monorail vehicle. This may prevent the driving assistance ECU 100 from erroneously implementing driving assistance, such as evacuation driving, assuming that the monorail vehicle is an actually existing target.

Next, the multipath ghost determination unit 87, the monorail environment determination unit 88, and the monorail vehicle determination unit 89 provide functions for determining whether the target detected by the target detection unit 84 is a monorail vehicle 6 in the monorail environment as illustrated in FIG. 2. The monorail environment refers to a driving environment in which there is a suspended monorail that suspends the monorail vehicle 6 above the road on which the subject vehicle 2 is traveling.

The multipath ghost determination unit 87 determines a target that is detected erroneously as a multipath ghost when radar waves hit and are reflected from a moving object traveling ahead of the subject vehicle 2, and some of the reflected waves hit a surrounding stationary object and returns to the subject vehicle 2 via the same moving object.

Figure 4:
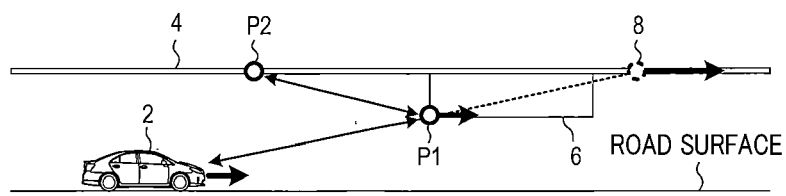
FIG. 4 is an illustration of a multipath ghost that occurs in a monorail environment as viewed from a side of a subject vehicle.
Figure 5:
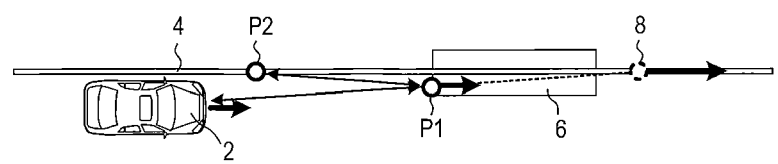
FIG. 5 is an illustration of a multipath ghost that occurs in a monorail environment as viewed from above the subject vehicle.

In other words, as illustrated in FIGS. 4 and 5, when the target detection unit 84 detects a monorail vehicle 6 in the monorail environment, the radar waves hit the monorail vehicle 6 and are reflected at the reflection point P1 on the monorail vehicle 6.

Some of the reflected waves from that reflection point P1 may hit the rail 4, from which the monorail vehicle 6 is suspended, and return to the radar device 10 from a reflection point P2 on the rail 4 via the monorail vehicle 6. In this case, the monorail vehicle 6 becomes a relay reflective target, relaying the radar waves between the radar device 10 and the rail 4.

When such multipath occurs, the target detection unit 84 erroneously detects a target that is a multipath ghost 8 due to reflected waves coming back from the rail 4 as being on the opposite side of the reflection point P1 on the monorail vehicle 6 from the reflection point P2.

Therefore, the multipath ghost determination unit 87 is used to identify multipath ghosts 8 among the targets detected by the target detection unit 84.

Next, the monorail vehicle determination unit 89 determines whether there is a monorail vehicle 6 among targets detected by the target detection unit 84 based on results of multipath ghost 8 determination by the multipath ghost determination unit 87.

When the monorail vehicle determination unit 89 determines that the target detected by the target detection unit 84 is a monorail vehicle 6, the monorail vehicle determination unit 89 restricts target information of the monorail vehicle 6 from being output from the target information output unit 86 to the driving assistance ECU 100.

By the way, in the target detection unit 84, a target that is a multipath ghost 8 may also be detected in a case where a relay reflective target that relays radar waves between the radar device 10 and a surrounding stationary object is not a monorail vehicle 6.

For example, in a case where radar waves reflected by another vehicle traveling ahead of the subject vehicle 2 hit a guardrail and the reflected waves from the guardrail return to the radar device 10 via the other vehicle, the target detection unit 84 may detect a target that is a multipath ghost 8.

The monorail environment determination unit 88 is provided such that the monorail vehicle determination unit 89 can accurately determine that the relay reflective target is a monorail vehicle 6, based on a result of determination of multipath ghosts 8 by the multipath ghost determination unit 87.

That is, the monorail environment determination unit 88 determines whether the driving environment around the subject vehicle 2 is a monorail environment, and when the driving environment around the subject vehicle 2 is a monorail environment, the monorail vehicle determination unit 89 determines the monorail vehicle 6. This can prevent the monorail vehicle determination unit 89 from making an erroneous determination of monorail vehicles 6.

The operations of the multipath ghost determination unit 87, the monorail environment determination unit 88, and the monorail vehicle determination unit 89 will now be described with reference to flowcharts in FIGS. 6 to 8.

Figure 6:
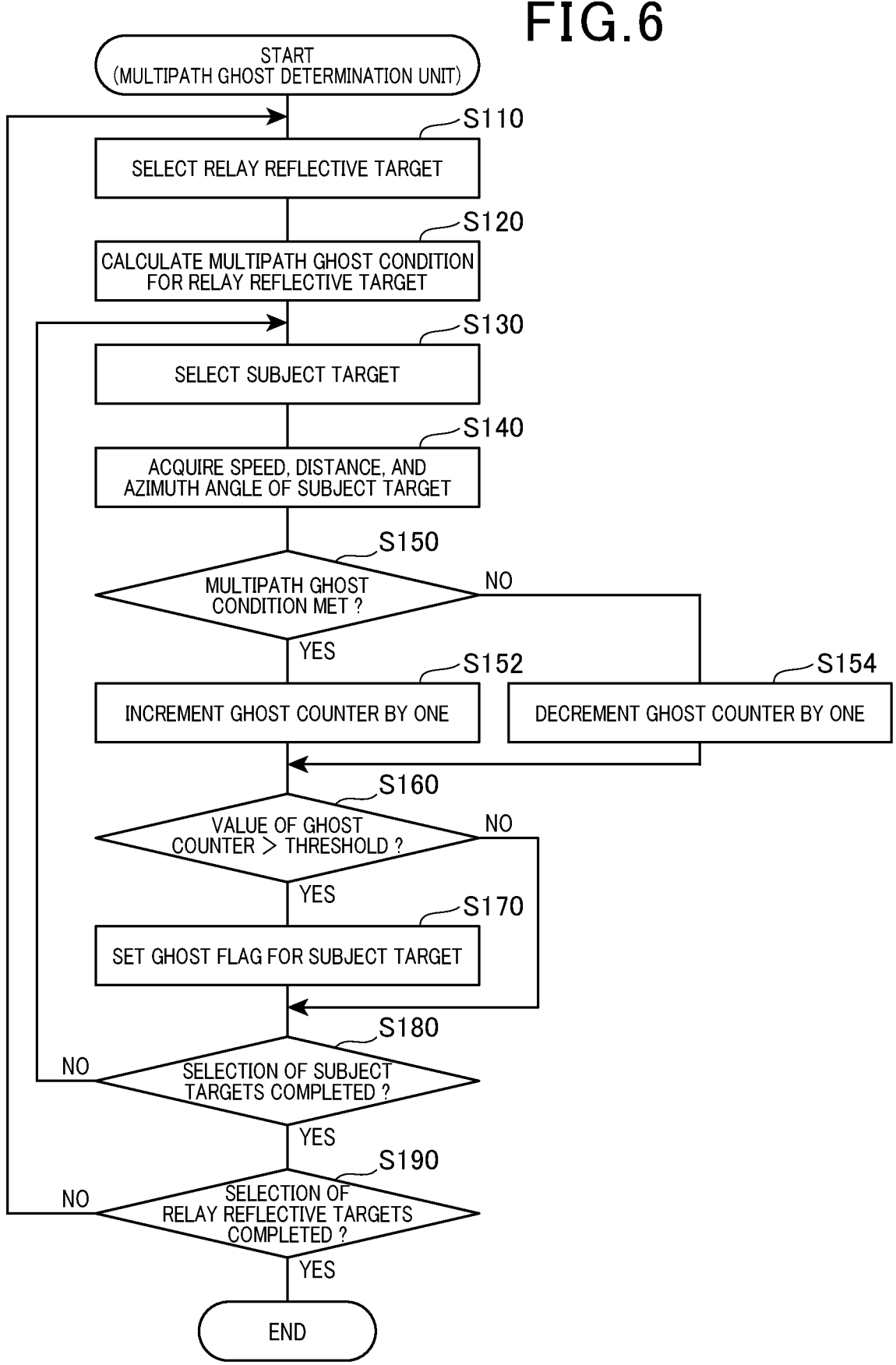
FIG. 6 is a flowchart of a multipath ghost determination process.
Figure 7:
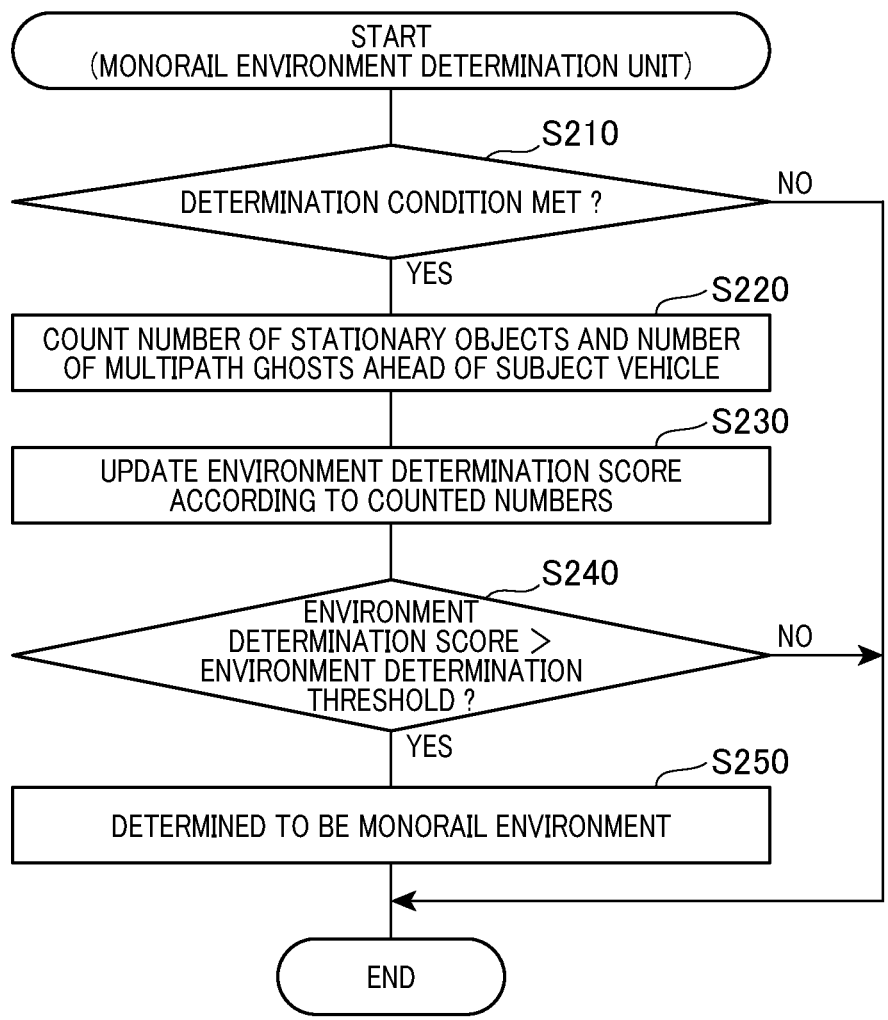
FIG. 7 is a flowchart of a monorail environment determination process.
Figure 8:
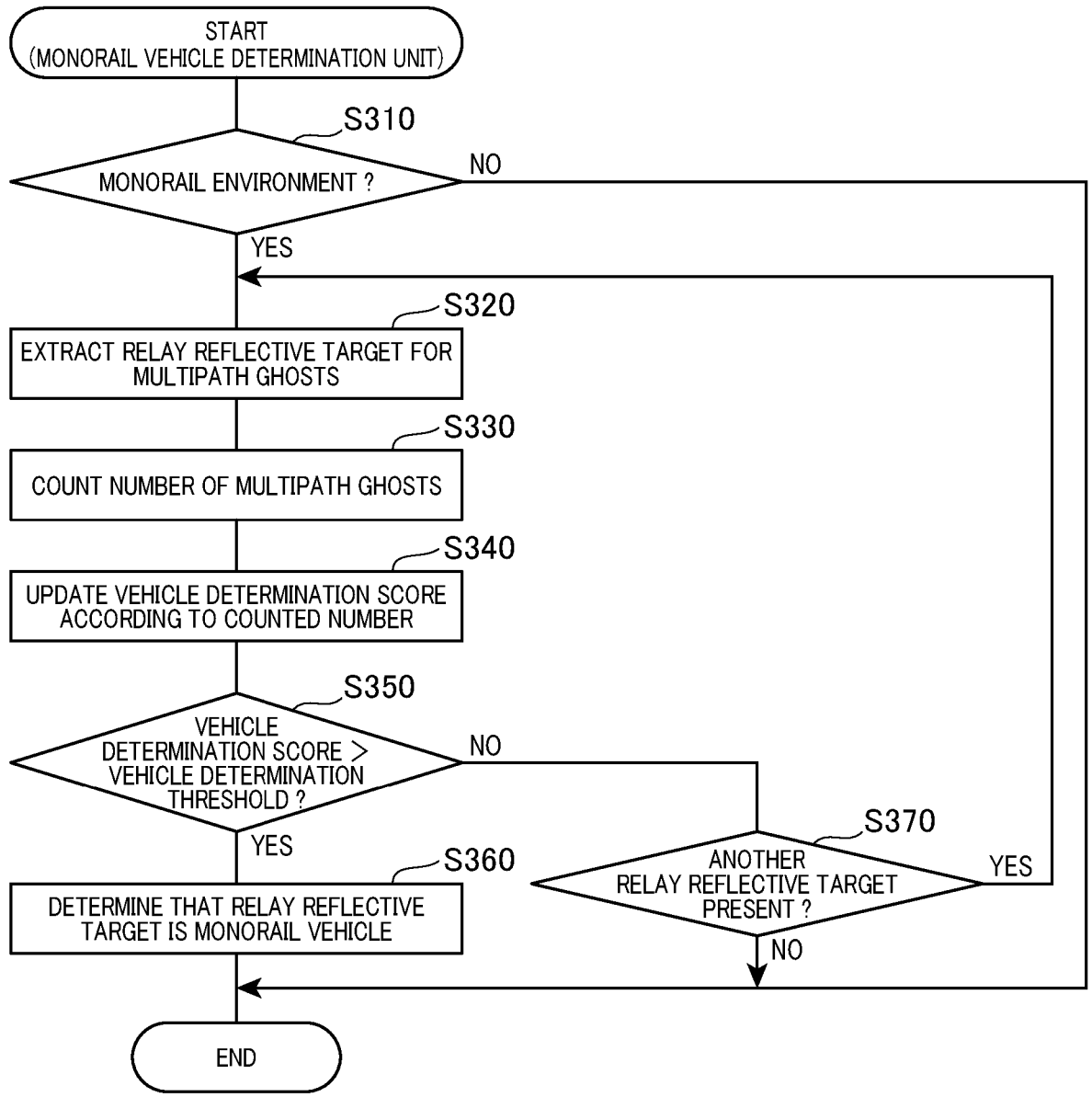
FIG. 8 is a flowchart of a monorail vehicle determination process.

The processes illustrated in FIGS. 6 to 8 are performed periodically by the CPU 71 in synchronization with the target detection process, and are performed by the CPU 71 executing a program stored in the memory 72.

Multipath Ghost Determination Process

FIG. 6 illustrates the multipath ghost determination process performed by the CPU 71 to implement the function of the multipath ghost determination unit 87.

As illustrated in FIG. 6, upon initiation of this process, first, at S110, the CPU 71 selects a moving object as a relay reflective target from a plurality of targets detected in the object detection process. Selection of the relay reflective target at S110 is performed by selecting, in order of closeness to the subject vehicle 2, the moving object from the plurality of targets detected by the target detection unit 84 each time the process at S110 is performed. Since the speed of a stationary object relative to the subject vehicle 2 corresponds to the vehicle speed of the subject vehicle 2, whether the target is a moving object or a stationary object is determined based on the speed of the target, specifically, a relative speed between the subject vehicle 2 and the target, and the vehicle speed of the subject vehicle 2.

Next, at S120, the CPU 71 acquires the vehicle speed Vs of the subject vehicle 2 from the driving assistance ECU 100 via the input/output unit 90. The CPU 71 calculates a multipath ghost condition based on the acquired vehicle speed Vs, and the distance R, azimuth angle θ, and speed V of the target selected as a relay reflective target at S 110.

The multipath ghost condition specifies the distance Rg and azimuth angle θg from the subject vehicle 2 to a multipath ghost 8 and the multipath ghost speed that is a relative speed between the subject vehicle 2 and the multipath ghost 8.

The multipath ghost speed Vg[m/s] is estimated based on the relay reflective target speed Vr[m/s] that is a relative speed between the relay reflective target and the subject vehicle 2, the azimuth angle θr[deg] of the relay reflective target, and the vehicle speed Vs[m/s] that is the speed of the subject vehicle 2.

For this estimation, for example, the following equation is used.

$$Vg[m/s]=2\times Vr[m/s]+Vs[m/s]\times \cos\theta r[deg].$$

This is because radar waves reflected by a stationary object such as a rail 4 and relayed by a relay reflective target passes through the relay reflective target twice and enters the radar device 10 at substantially the same angle as the azimuth θr[deg] of the relay reflective target, and the speed of the stationary object corresponds to the vehicle speed Vs[m/s] of the subject vehicle 2.

The multipath ghost condition includes the following three conditions 1 to 3, where the subject target is a target to be determined as to whether it is a multipath ghost 8.

Condition 1: subject target distance Rt[m]−relay reflective target distance Rr[m]>distance difference threshold ΔR[m]

Condition 2: |subject target speed Vt[m/s]−multipath ghost speed Vg[m/s]|<speed difference threshold ΔV[m/s].

Condition 3: |subject target azimuth angle θt[deg]−relay reflective target azimuth angle θr[deg]|<azimuth-angle difference threshold [deg].

That is, the condition 1 means that the subject target distance Rt[m], which is a distance from the subject vehicle 2 to the relay reflective target, is greater than the relay reflective target distance by a predefined distance difference threshold ΔR[m].

The condition 2 means that the absolute value of the difference between the subject target speed Vt[m/s], which is a relative speed between the subject vehicle 2 and the subject target, and the multipath ghost speed Vg[m/s] calculated by the above expression is less than a predefined speed difference threshold ΔV[m/s]. In other words, the condition 2 means that the subject target speed Vt[m/s] and the multipath ghost speed Vg[m/s] are substantially the same.

The condition 3 means that the absolute value of the difference between the azimuth angle of the subject target θt[deg] and the azimuth angle of the relay reflective target θr[deg] is less than a predefined azimuth-angle difference threshold Δθ[deg]. In other words, the condition 3 means that the azimuth angle of the subject target θt[deg] and the azimuth angle of the relay reflective target θr[deg] are substantially the same.

Next, at S130, the CPU 71 selects, from the plurality of targets detected by the target detection unit 84, a stationary object with a distance to the subject vehicle 2 greater than a distance between the relay reflective target and the subject vehicle 2, as a subject target, and proceeds to S140.

The subject target is selected in order of closeness to the subject vehicle 2. Besides a selection condition for the subject target based on the distance to the subject vehicle 2, the selection condition for the subject target may be set to select targets within a predefined angle range centered at the azimuth angle of the relay reflective target.

At S140, the CPU 71 acquires the distance R, azimuth angle θ, and speed V of the target selected as the subject target at S130 as the subject target distance Rt, subject target azimuth angle θt, and subject target speed Vt, respectively, as described above.

Subsequently, at S150, the CPU 71 determines whether the subject target distance Rt, subject target azimuth angle θt, and subject target speed Vt acquired at S140 meet the above conditions 1 through 3, respectively.

At S150, if the subject target distance Rt, subject target azimuth θt, and subject target speed Vt all meet the conditions 1 through 3, the CPU 71 determines that the multipath ghost condition is met, and proceeds to S152. At S152, the CPU 71 increments a ghost counter for the currently selected subject target and proceeds to S160.

If it is determined at S150 that the multipath ghost condition is not met, the CPU 71 proceeds to S154. At S154, the CPU 71 decrements the ghost counter for the currently selected subject target and proceeds to S160.

The ghost counter is decremented such that the ghost counter is not updated to a negative value when the minimum value is zero and the multipath ghost condition is not met.

Next, at S160, the CPU 71 determines whether the value of the ghost counter, which is updated as described above, has exceeded a predefined threshold value. If the value of the ghost counter has exceeded the threshold value, the CPU 71 determines that the subject target is a multipath ghost 8 and proceeds to S170 to set a ghost flag for the subject target. This allows it to be stored in the memory 72 or a register of the processing unit 70 that the target currently selected as the subject target is a multipath ghost 8.

If the ghost flag is set at S170, or if it is determined at S160 that the value of the ghost counter is less than or equal to the threshold value, the CPU 71 proceeds to S180. At S180, the CPU 71 determines whether selection of subject targets at S130 has been completed by determining whether all the targets that meet the selection condition have been selected as subject targets.

If it is determined at S180 that selection of the subject targets has been completed, the CPU 71 proceeds to S190. If it is determined at S180 that selection of the subject targets has not been completed, the CPU 71 proceeds to S130 and performs successive steps from S130 again.

At S190, the CPU 71 determines whether selection of relay reflective targets has been completed by determining whether a predefined number of relay reflective targets have been selected at S110. If it is determined at S 190 that selection of relay reflective targets has been completed, the CPU 71 terminates the multipath ghost determination process. If it is determined at S190 that selection of relay reflective targets has not been completed, the CPU 71 proceeds to S110 and performs successive steps from S110 again.

In this manner, in the multipath ghost determination process, for each target detected in the target detection process performed by the target detection unit 84, a determination as to whether the target is a multipath ghost 8 is made. If it is determined that the target is a multipath ghost 8, a ghost flag for the target is set.

For a target for which the ghost flag is set, the target information output unit 86 may be prohibited from outputting target information to the driving assistance ECU 100 because the target is a multipath ghost 8 that does not actually exist. Alternatively, the target information having information added indicating that the target is a multipath ghost 8 may be output from the target information output unit 86 to the driving assistance ECU 100.

Monorail Environment Determination Process

FIG. 7 illustrates a monorail environment determination process performed by the CPU 71 to implement the function of the monorail environment determination unit 88.

As illustrated in FIG. 7, in the monorail environment determination process, at S210, the CPU 71 determines whether a determination condition for the monorail environment is met. The determination condition for the monorail environment is set such that it is not met, for example, when the subject vehicle 2 is stationary or when the subject vehicle is traveling on a curved road. In other words, the determination condition for the monorail environment is set to be met when the subject vehicle 2 is traveling straight.

This is because in the radar device 10, a rail 4 of the monorail is detected as a plurality of targets disposed linearly along the rail 4. This is also because when the monorail vehicle 6 is traveling, the rail 4 is detected as a plurality of multipath ghosts 8 disposed linearly along the rail 4.

In other words, when the subject vehicle 2 is stationary or traveling on a curved road, a series of targets or multipath ghosts 8 along the rail 4 may not be detected. Therefore, in the present embodiment, the determination condition for the monorail environment is defined as being met when the subject vehicle 2 is traveling straight.

If it is determined at S210 that the determination condition for the monorail environment is not met, the CPU 71 terminates the monorail environment determination process. If it is determined at S210 that the determination condition for the monorail environment is met, the CPU 71 proceeds to S220.

At S220, the CPU 71 counts the number of stationary objects and multipath ghosts 8 disposed linearly ahead of the subject vehicle 2 among the targets detected in the object detection process. The number of multipath ghosts 8 is the number of targets disposed linearly ahead of the subject vehicle 2 among the targets each determined to be a multipath ghost 8 in the multipath ghost determination process illustrated in FIG. 6.

Next, at S230, the CPU 71 updates an environment determination score such that the larger the counted numbers, the higher the environment determination score according to the counted number of stationary objects and the counted number of multipath ghosts 8 counted at S220. If the counted numbers are small, the CPU 71 updates the environment determination score such that the environment determination score becomes lower.

At S240, the CPU 71 determines whether the environment determination score updated at S230 has exceeded a predefined environment determination threshold. If the environment determination score has not exceeded the environment determination threshold, the CPU 71 terminates the monorail environment determination process.

If it is determined at S240 that the environment determination score has exceeded the environment determination threshold, the CPU 71 determines at S250 that the environment in which the subject vehicle 2 is traveling is a monorail environment, stores the determination in the memory 72 or register, and then terminates the monorail environment determination process.

If it is determined at S240 that the environment determination score has not exceeded the environment determination threshold, i.e., the environment in which the subject vehicle 2 is traveling is not a monorail environment, the recordation that the environment in which the subject vehicle 2 is traveling is a monorail environment is erased. In the present embodiment, the environment determination score corresponds to a second determination value in the present disclosure, and the environment determination threshold corresponds to a second threshold in the present disclosure.

In this manner, in the monorail environment determination process, the number of stationary objects and the number of multipath ghosts 8 disposed linearly ahead of the subject vehicle 2 among the targets detected in the object detection process are counted, and based on the counted numbers, it is determined whether there is a rail 4 around the subject vehicle 2. Therefore, it is possible to accurately determine that the environment in which the subject vehicle 2 is traveling is a monorail environment.

To determine whether the environment in which the subject vehicle 2 is traveling is a monorail environment, it is not necessary to perform the monorail environment determination process. That is, for example, the monorail environment determination unit 88 may acquire map information from a navigation system or the like and determine whether the environment in which the subject vehicle 2 is traveling is a monorail environment based on the map information.

For example, when the monorail environment is detected using map information, the monorail environment determination process may be performed by changing the environment determination threshold to make it easier to determine the monorail environment. This can make it earlier to determine the monorail environment in the monorail environment determination process, and can increase the accuracy of determining the monorail environment.

Monorail Vehicle Determination Process

FIG. 8 illustrates a monorail vehicle determination process performed by the CPU 71 to implement the function of the monorail vehicle determination unit 89.

As illustrated in FIG. 8, in the monorail vehicle determination process, first, at S310, the CPU 71 determines whether the environment in which the subject vehicle 2 is traveling is a monorail environment, based on the result of the monorail environment determination process. If the environment in which the subject vehicle 2 is traveling is not a monorail environment, the CPU 71 terminates the monorail vehicle determination process. If the environment in which the subject vehicle 2 is traveling is a monorail environment, the CPU 71 proceeds to S320.

At S320, the CPU 71 extracts one of the relay reflective targets for the targets determined to be multipath ghosts 8 in the multipath ghost determination process, and proceeds to S330. At S330, the CPU 71 counts the number of multipath ghosts 8 detected erroneously as targets due to radar waves being relayed by the extracted relay reflective target.

This is because the multipath ghosts 8 erroneously detected with the monorail vehicle 6 as a relay reflective target appear as a plurality of targets disposed linearly along the rail 4. That is, at S330, the number of multipath ghosts 8 erroneously detected for the extracted one of the relay reflective targets is counted, which allows a determination as to whether the one of the relay reflective targets is a monorail vehicle 6 to be made based on the counted number.

Next, at S340, the CPU 71 updates the vehicle determination score according to the number of multipath ghosts 8 counted at S330 such that the larger the counted number, the higher the vehicle determination score. The CPU 71 updates the vehicle determination score such that the vehicle determination score becomes lower when the counted number is smaller.

At S350, the CPU 71 determines whether the vehicle determination score updated at S340 has exceeded a predefined vehicle determination threshold. If the CPU 71 determines at S350 that the vehicle determination score has exceeded the vehicle determination threshold, the CPU 71 proceeds to S360 to determine that the relay reflective target extracted at S320 is a monorail vehicle 6.

At S360, the CPU 71 stores the result of determination that the relay reflective target is a monorail vehicle 6 in the memory 72 or a register, restricts outputs of the target information of the monorail vehicle 6 from the target information output unit 86, and terminates the monorail vehicle determiner process.

On the other hand, if the CPU 71 determines at S350 that the vehicle determination score has not exceeded the vehicle determination threshold, the CPU 71 proceeds to S370. At S370, after initiating the monorail vehicle determination process, the CPU 71 determines whether there is another one of the relay reflective targets for the targets determined to be multipath ghosts 8 in the multipath ghost determination process, other than the relay reflective target extracted at S320.

If the CPU 71 determines at S370 that there is another relay reflective target, the CPU 71 proceeds to S320, extracts the other relay reflective target at S320, and performs successive steps from S330. If the CPU 71 determines at S370 that there is no other relay reflective target, that is, if the CPU 71 determines that the determination of monorail vehicles 6 is completed for all the relay reflective targets, the CPU 71 terminates the monorail vehicle determination process because the monorail vehicle 6 is no longer detected as a target.

Effects

As described above, according to the radar device 10 of the present embodiment, multipath ghosts 8 are detected by determining whether each of targets detected by transmitting and receiving radar waves is a multipath ghost 8. For each of relay reflective targets that caused the detected multipath ghosts 8, the number of multipath ghosts 8 generated by the relay reflective target is counted, and based on the counted number, it is determined whether the relay reflective target is a monorail vehicle 6.

The determination of multipath ghosts 8 is performed by setting the multipath ghost condition based on the position and speed of the relay reflective target selected as a relay reflective target and the speed of the subject vehicle, and extracting targets that meet the multipath ghost condition.

According to the radar device 10 of the present embodiment, it can be determined that the target detected by the target detection unit 84 is a monorail vehicle by using only results of determination of targets detected by the target detection unit 84. Therefore, according to the radar device 10 of the present embodiment, in order to determine the monorail vehicle 6, it is not necessary to recognize the monorail vehicle 6 by image processing images of surroundings of the subject vehicle 2 captured by a camera, so that the monorail vehicle 6 can be determined readily.

In the present embodiment, it is determined whether the environment in which the subject vehicle 2 is traveling is a monorail environment, and when the environment in which the subject vehicle is traveling is a monorail environment, it is determined whether the detected target is a monorail vehicle 6. Therefore, when the environment in which the vehicle is traveling is not a monorail environment, the detected target is not determined erroneously as a monorail vehicle 6, which improves the accuracy of determination of monorail vehicles 6.

Other Embodiments

While the specific embodiment of the present disclosure has been described above, the present disclosure is not limited to the above-described embodiment, and may be implemented with various modifications.

For example, in the present embodiment, only the result of target detection by the target detection unit 84 is used to make a determination as to whether a target detected by the target detection unit 84 is a monorail vehicle 6. Alternatively, images captured by a camera may be used to make such a determination.

That is, an image recognition unit may be provided to recognize a monorail vehicle 6 from images captured by a forward-looking camera mounted to the subject vehicle 2, and when a monorail vehicle 6 is recognized by the image recognition unit, the monorail vehicle determination unit 89 may perform the determination of monorail vehicles 6. In this manner, it may be possible to determine more accurately that the detected target is a monorail vehicle 6.

On the other hand, the phenomenon in which the monorail vehicle 6 serves as a relay reflective target reflecting radar waves along the rail 4 and multipath ghosts 8 disposed linearly are detected, may also occur in a situation where there are a track and its upper structure. However, in this situation, the height of the monorail vehicle 6 that serves as a relay reflective target and the height of the track are significantly different, with the monorail vehicle 6 being higher than the track.

Therefore, the determination of monorail vehicles 6 may be performed when the height of the relay reflective target corresponds to the height of the monorail vehicle 6. The height of the relay reflective target may be determined from the distance and the azimuth angle of the relay reflective target.

However, the height of the relay reflective target detected in this manner varies in detection accuracy depending on misalignment of the axis and distance between the transmitting and receiving parts of the radar waves. Thus, in cases where the height of the relay reflective target is included in the determination condition for the monorail vehicle 6, the determination of monorail vehicles 6 may be performed under a condition where the detection accuracy of the height can be ensured, such as the distance to the relay reflective target.

In addition, in the above embodiment, the monorail vehicle determination unit 89 has been described as being configured to determine whether the relay reflective target is a monorail vehicle 6 when it has been determined by the monorail environment determination unit 88 that the environment around the subject vehicle is a monorail environment.

However, the monorail vehicle determination unit 89 may perform determination of monorail vehicles 6 at all times and output results of determination of monorail vehicles 6 to the target information output unit 86 only when the monorail environment determination unit 88 has determined that the environment around the subject vehicle is a monorail environment.

The method for the processing unit 70 to determine a monorail vehicle 6 may be realized by a dedicated computer provided by configuring a processor and memory programmed to perform one or more functions embodied in a computer program. Alternatively, the method for the processing unit 70 to determine a monorail vehicle 6 may be realized by a dedicated computer provided by configuring a processor with one or more dedicated hardware logic circuits.

Alternatively, the method for the processing unit 70 to determine a monorail vehicle 6 may be realized by one or more dedicated computers configured by a combination of a processor and memory programmed to perform one or more functions, and a processor configured with one or more hardware logic circuits.

The computer programs to be executed the processing unit 70 may be stored, as instructions to be executed by a computer, in a non-transitory, tangible computer-readable storage medium. The technique for implementing the functions of each part included in the processing unit 70 does not necessarily include software, and all of its functions may be implemented using one or more pieces of hardware.

A plurality of functions possessed by one constituent element in any one of the foregoing embodiments may be implemented by a plurality of constituent elements, or one function possessed by one constituent element may be implemented by a plurality of constituent elements. In addition, a plurality of functions possessed by a plurality of constituent elements may be implemented by one constituent element, or one function implemented by a plurality of constituent elements may be implemented by one constituent element. Some of the components in any one of the foregoing embodiments may be omitted. At least part of configuration of any one of the foregoing embodiments may be added to or replaced with configuration of another one of the foregoing embodiments.

Besides the radar device for a vehicle described above, the present disclosure can be implemented in various modes such as a system including the radar device for a vehicle as a constituent element, a program for causing a computer to serve as the radar device for a vehicle, a non-transitory and tangible storage medium such as a semiconductor memory storing this program, the rainfall determination method of the radar device for a vehicle, and others.

What is claimed is:

1. A radar device for a vehicle, configured to detect targets around the vehicle, comprising:
    a target detection unit configured to detect a position and a speed of a target by transmitting radar waves to surroundings of the vehicle, receiving reflected waves of the radar waves, and performing frequency analysis of transmission and reception signals;
    a multipath ghost determination unit configured to extract, from a plurality of targets detected by the target detection unit, a moving object that relays the radar waves between the target detection unit and another target as a relay reflective target, and determine a target detected erroneously as a moving object by the target detection unit due to a stationary object from or to which the radar waves are relayed by the relay reflective target, as being a multipath ghost;
    a monorail environment determination unit configured to determine whether an environment in which the vehicle is traveling is a monorail environment where a monorail is present above a road on which the vehicle is traveling; and
    a monorail vehicle determination unit configured to, in response to the monorail environment determination unit determining that the environment in which the vehicle is traveling is the monorail environment, count, for each relay reflective target, a number of targets each determined to be a multipath ghost by the multipath ghost determination unit, and determine that the relay reflective target for which a first determination value set according to the counted number of targets is greater than or equal to a first threshold value is a monorail vehicle.

2. The radar device according to claim 1, wherein the monorail environment determination unit is configured to count the number of targets detected by the target detection unit as stationary objects disposed linearly ahead of the vehicle in a direction of travel of the vehicle, and a number of multipath ghosts determined by the multipath ghost determination unit to be disposed linearly ahead of the vehicle in the direction of travel of the vehicle, and in response to a second determination value set according to the counted number of targets and the counted number of multipath ghosts being greater than or equal to a second threshold value, determine that the environment in which the vehicle is traveling is the monorail environment.

3. The radar device according to claim 1, wherein the multipath ghost determination unit is configured to set, for each relay reflective target extracted from a plurality of targets detected by the target detection unit, a multipath ghost condition representing a position and a speed of the target detected erroneously by the target detection unit due to a stationary object from or to which the radar waves are relayed by the relay reflective target, based on a position and a speed of the relay reflective target and a speed of the vehicle, extract, from the plurality of targets detected by the target detection unit, a target that meets the multipath ghost condition, and determine the extracted target to be a multipath ghost.

4. A radar device for a vehicle, configured to detect targets around the vehicle, comprising:
    a non-transitory memory storing one or more computer programs; and
    a processor executing the one or more computer programs to:
    detect a position and a speed of a target by transmitting radar waves to surroundings of the vehicle, receiving reflected waves of the radar waves, and performing frequency analysis of transmission and reception signals;

extract, from a plurality of targets detected, a moving object that relays the radar waves between the radar device and another target as a relay reflective target, and determine a target detected erroneously as a moving object due to a stationary object from or to which the radar waves are relayed by the relay reflective target, as being a multipath ghost;

determine whether an environment in which the vehicle is traveling is a monorail environment where a monorail is present above a road on which the vehicle is traveling; and in response to determining that the environment in which the vehicle is traveling is the monorail environment, count, for each relay reflective target, a number of targets each determined to be a multipath ghost, and determine that the relay reflective target for which a first determination value set according to the counted number of targets is greater than or equal to a first threshold value is a monorail vehicle.

* * * * *